F. P. JAQUITH.

Improvement in Mechanisms for Transmitting Power.

No. 115,861. Patented June 13, 1871.

Witnesses.
Chas. C. Wilson
Edmund Massar

Frederick P. Jaquith.
By atty A. B. Stoughton.

UNITED STATES PATENT OFFICE.

FREDERICK P. JAQUITH, OF HOOSICK FALLS, NEW YORK, ASSIGNOR TO HIMSELF, LYMAN W. WILDER, WILLIAM CHAPMAN, AND ALVIN WILLEY, OF SAME PLACE.

IMPROVEMENT IN MECHANISMS FOR TRANSMITTING POWER.

Specification forming part of Letters Patent No. 115,861, dated June 13, 1871.

*To all whom it may concern:*

Be it known that I, FREDERICK P. JAQUITH, of Hoosick Falls, in the county of Rensselaer and State of New York, have invented certain new and useful Improvements in an Arrangement of Mechanism for Transmitting Power; and I do hereby declare the following to be a full, clear, and exact description of the same, reference being had to the accompanying drawing making a part of this specification, in which—

Figure 1:
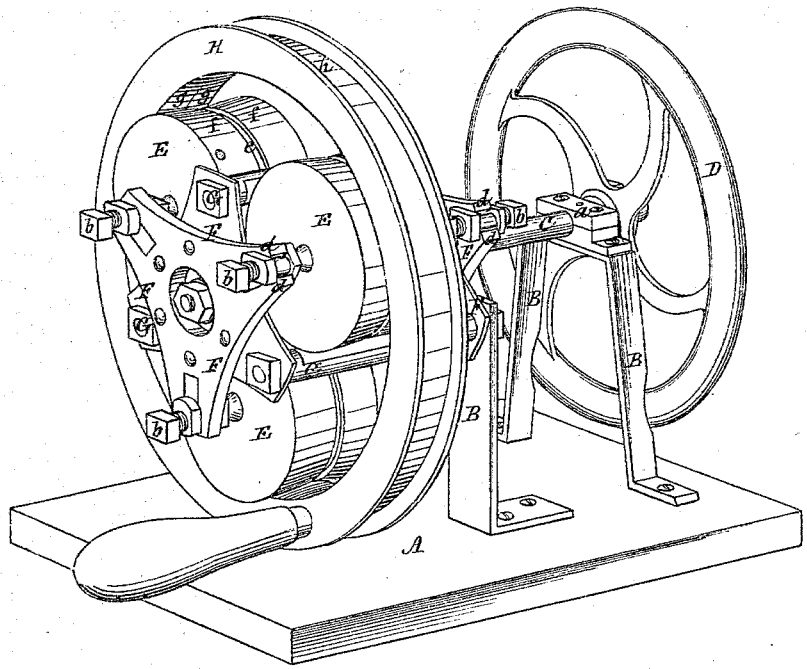
Figure 2:
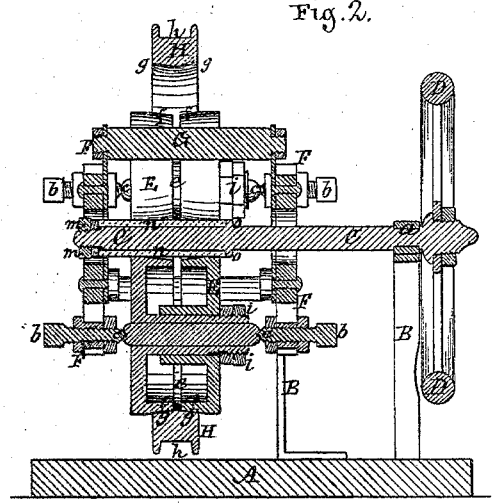
Figure 3:
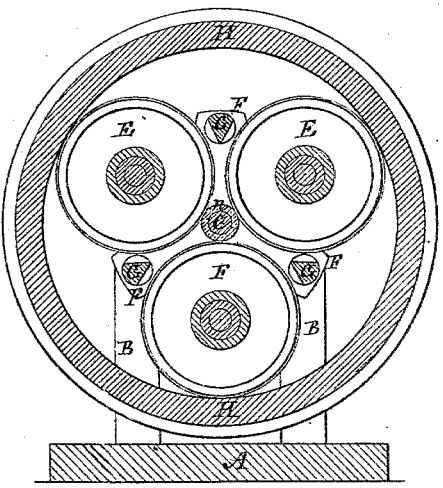

Figure 1 represents the mechanism in perspective. Fig. 2 represents a longitudinal vertical section thereof. Fig. 3 represents a vertical transverse section through the belt-rim and internal driving rolls or wheels.

Similar letters of reference, where they occur in the separate figures, denote like parts of mechanism in the drawing.

My invention consists in the arrangement of a driving belt, rim, or annulus, with driving rolls or gears internally arranged therein, so as to run in contact with the inner perimeter of said belt-rim, and an independent central shaft, against which said rolls or gears run, to rotate said shaft and drive any machine connected thereto.

To enable others skilled in the art to make and use my invention, I will proceed to describe the same with reference to the drawing.

Upon the bed or base A are fixed the supports B B, for sustaining the power-transmitting mechanism. The shaft C, which has upon it the balance-wheel D, turns in a journal box or bearing at $a$. Its forward end is supported and turned by its contact with the rolls, wheels, or gears E, of which there are three. Two star-shaped heads, F, are bolted together by bolts or rivets G running from one to the other head; and this constitutes a frame, in which the rolls or gears E are hung, made adjustable, and are revolved, and so revolve the central shaft C, in contact with which they run or turn. The rolls or gears E are not hung or turned upon shafts in the ordinary way, but are supported by the points $c$ of set-screws $b$, which enter conical recesses in or against said rolls, and by means of said set-screws and the slotted arms $d$ of the frame F, they can be adjusted radially, as also in the line of their centers of motion. These rolls or gears E are represented as made in two sections, or divided as at $e$, and their perimeters are made conical or tapering toward their middles, as at $f$, for a purpose to be presently explained. The object of dividing the wheels, as at $e$, and leaving a space at said line of division, is that one half or section may be moved toward or from the other, and there held by the jam-nuts $i$. The belt-rim H, which is a ring without hub, shaft, web, or spokes, is grooved out in its outer perimeter, as seen at $h$, to receive and retain the belt or band by which it is driven. Its inner perimeter is tapered or made conical from the sides toward the center, as seen at $g$, and the reverse of the bevel or taper $f$ of the rolls or wheels E—one being concave, the other convex—so that said beveled or tapered surfaces will run in contact with each other, and with such frictional contact as will transmit the motion of the rim H through the rolls or gears E to the central shaft C, whence it may be used for running a saw or any other attachment to said shaft.

I have described the contact between these moving and transmitting devices as frictional only. It is obvious, however, that the rim may have internal cog-gears, and the rolls or wheels and the central shaft have external cogged gears on them, so that the transmission of the power may be positive and without liability to slip.

If cogged gearing be substituted for the frictional contact, then the wheels or rolls may be in one instead of two parts; otherwise the mechanism would be the same.

The shaft C, when run by frictional contact only, may be covered by leather or other holding and durable material, as at $n$.

I find leather rings or washers, slipped onto the shaft and tightly jammed up against the collar $o$ by the nut $m$, answer a good purpose.

Having thus fully described my invention, what I claim as new, and desire to secure by Letters Patent, is—

The arrangement of the belt-rim H, intermediate rolls or gears E, and central shaft C, for transmitting power from said rim to said central shaft, the parts operating together as and for the purpose described and represented.

FREDK. P. JAQUITH.

Witnesses:
   A. B. STOUGHTON,
   EDMUND MASSON.